United States Patent
Rutledge et al.

(10) Patent No.: US 10,412,463 B2
(45) Date of Patent: Sep. 10, 2019

(54) RESOURCE BASED-VIDEO QUALITY ADJUSTMENT

(71) Applicant: Verizon Patent and Licensing Inc., Arlington, VA (US)

(72) Inventors: Christopher Lee Rutledge, Somerset, NJ (US); Dan Sun, Bridgewater, NJ (US); Yuk Lun Li, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/644,049

(22) Filed: Jul. 7, 2017

(65) Prior Publication Data

US 2019/0014388 A1     Jan. 10, 2019

(51) Int. Cl.
| | |
|---|---|
| H04N 7/16 | (2011.01) |
| H04N 21/61 | (2011.01) |
| H04N 21/414 | (2011.01) |
| H04L 29/06 | (2006.01) |
| H04N 21/462 | (2011.01) |
| H04N 21/4402 | (2011.01) |
| H04N 7/18 | (2006.01) |
| H04N 21/2187 | (2011.01) |
| H04N 21/2343 | (2011.01) |
| H04N 21/6379 | (2011.01) |
| H04W 84/12 | (2009.01) |

(52) U.S. Cl.
CPC ....... *H04N 21/6181* (2013.01); *H04L 65/605* (2013.01); *H04L 65/607* (2013.01); *H04L 65/80* (2013.01); *H04N 7/183* (2013.01); *H04N 21/2187* (2013.01); *H04N 21/234309* (2013.01); *H04N 21/41407* (2013.01); *H04N 21/440218* (2013.01); *H04N 21/4621* (2013.01); *H04N 21/6131* (2013.01); *H04N 21/6379* (2013.01); *H04W 84/12* (2013.01)

(58) Field of Classification Search
CPC ......... H04N 21/6181; H04N 21/41407; H04N 21/440218; H04N 21/4621; H04L 65/607; H04L 65/80
USPC ....................................................... 725/62
See application file for complete search history.

(56) References Cited

U.S. PATENT DOCUMENTS

| | | | | |
|---|---|---|---|---|
| 2002/0046405 A1* | 4/2002 | Lahr | ................. | H04L 29/06027 725/87 |
| 2003/0110213 A1* | 6/2003 | Munetsugu | ........ | H04N 7/17318 709/203 |
| 2006/0018257 A1* | 1/2006 | Seo | ....................... | H04L 1/0002 370/232 |
| 2009/0287764 A1* | 11/2009 | Pazhyannur | .......... | H04L 63/102 709/203 |

(Continued)

*Primary Examiner* — Nnenna N Epko

(57) ABSTRACT

Network conditions are taken into consideration, by wireless edge devices, when streaming content, such as video content, over a wireless network. A video capture device, such as a video recorder, may be controlled, by the edge device, to adjust the bit rate, capture resolution, or other parameters relating to upload bandwidth of the video stream. The wireless edge device may transcode the video stream received from the capture device to adjust the encoding technique for the video stream. Advantageously, the wireless network and edge devices may work together to offer optimal video quality that fits within required network constraints.

20 Claims, 8 Drawing Sheets

(56) References Cited

U.S. PATENT DOCUMENTS

2014/0274082 A1\* 9/2014 Huang ................. H04W 28/20
                                                    455/450
2017/0250882 A1\* 8/2017 Kellicker ................ H04L 43/08
2017/0346874 A1\* 11/2017 Schmidt ............. H04N 21/2343

\* cited by examiner

RESOURCE BASED-VIDEO QUALITY ADJUSTMENT

BACKGROUND

Support of real-time and near real-time video can come at a significant cost to wireless network resources, particularly if the video is delay intolerant or is of high quality. For instance, in a wireless cellular network, cell usability may be directly affected by the resolution and quality of video traversing the radio links of the network (i.e., the links associated with the base stations of the wireless network). In other words, high quality may be provided at the expense of link budget. Similarly, high bit rates that may be consumed by streaming video can directly affect the number of customers that can be supported by a particular base station.

The emerging trend of virtual reality (VR) and augmented reality (AR) is likely to exacerbate the load on wireless networks, as AR/VR devices can be particularly bandwidth intensive. It is thus desirable to minimize the impact of high bandwidth devices on the cellular wireless network. The radio access network (RAN) portion of a wireless network, in particular, is typically the limiting factor network capacity. Accordingly, it would be desirable, when using high bandwidth applications, to maximize efficiency of the RAN.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Consistent with techniques described herein, network conditions may be taken into consideration, by wireless edge devices, when streaming content, such as video content, via a wireless network. In one implementation, a video capture device, such as a video recorder, may be controlled to adjust the bit rate, capture resolution, or other parameters relating to upload bandwidth of the video stream. The wireless edge device may transcode the video stream received from the capture device to adjust the encoding technique for the video stream. Advantageously, the wireless network and edge devices may work together to offer optimal video quality that fits within required network constraints.

Figure 1:
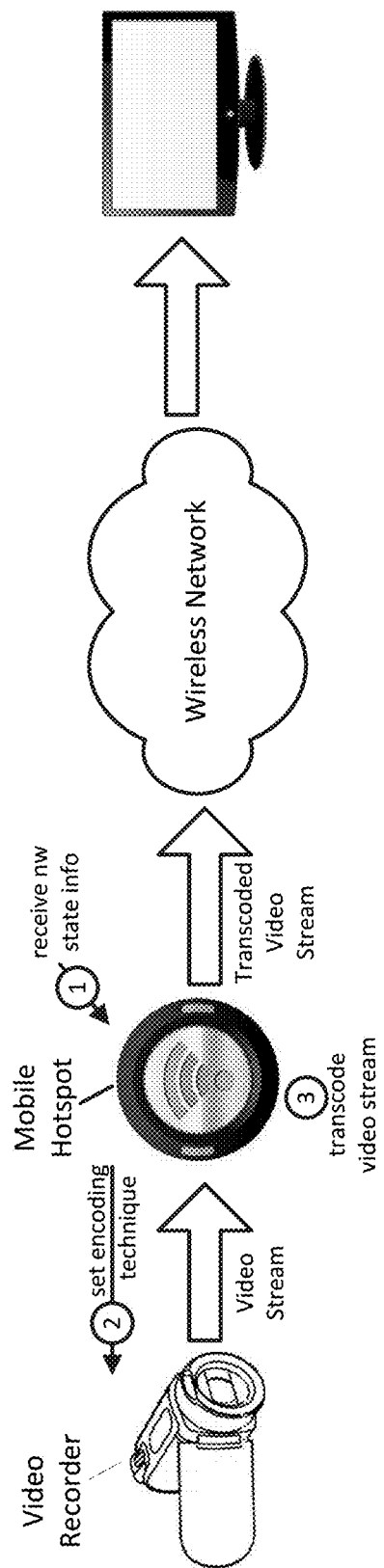
FIG. 1 is a diagram conceptually illustrating an example overview of concepts described herein.

FIG. 1 is a diagram conceptually illustrating an example overview of concepts described herein. As shown, a video recorder may record video. The video may be uploaded, by a mobile hotspot, via a wireless network, such as a cellular wireless network. The video may be uploaded to a content server (not shown in FIG. 1) for storage and later display at a display device or directly transmitted to the display device. In the example illustrated in FIG. 1, the mobile hotspot may include a cellular interface for communicating with the wireless network and another wireless interface, such as a Wi-Fi interface, for communicating with devices near the mobile hotspot (such as the video recorder). In this manner, the mobile hotspot may provide a portable link to provide network (e.g., Internet) connectivity to devices.

The mobile hotspot may receive or measure information relating to the state of the wireless network (at 1, "receive nw state info"). In one implementation, the mobile hotspot may measure the bit rate or quality of the wireless link that is used to connect the video recorder to the wireless network. Alternatively or additionally, the mobile hotspot may receive explicit messages, such as from a network element associated with the wireless network, indicating the state of the wireless network.

Based on the state of the wireless network, and potentially based on other information (e.g., information, such as battery life, relating to the mobile hotspot or the video recorder) the mobile hotspot may control the transcoding of the video stream to optimize the video stream for the wireless link between the mobile hotspot and the wireless network. In situations in which the video recorder is controllable by the mobile hotspot, the mobile hotspot may control the video recorder to use the optimal video encoding technique (at 2, "set encoding technique"). Alternatively, the mobile hotspot may transcode the video stream received from the video recorder to obtain the optimal video encoding technique (at 3, "transcode video stream").

In some situations, the optimal video encoding technique may be achieved by customizing the operations at both the video recorder and the mobile hotspot. For example, the video recorder may be controlled to capture video at a particular video resolution, and the mobile hotspot may transcode the received video stream to provide a particular level of compression. In one implementation, the maximum allowed data priority and rate, provided by the wireless network, may be used to determine the optimal video encoding technique to use. Advantageously, the quality of the video streamed over the wireless network can be maximized to fit the capacity of the wireless network, and to thus maximize the user experience.

Figure 2:
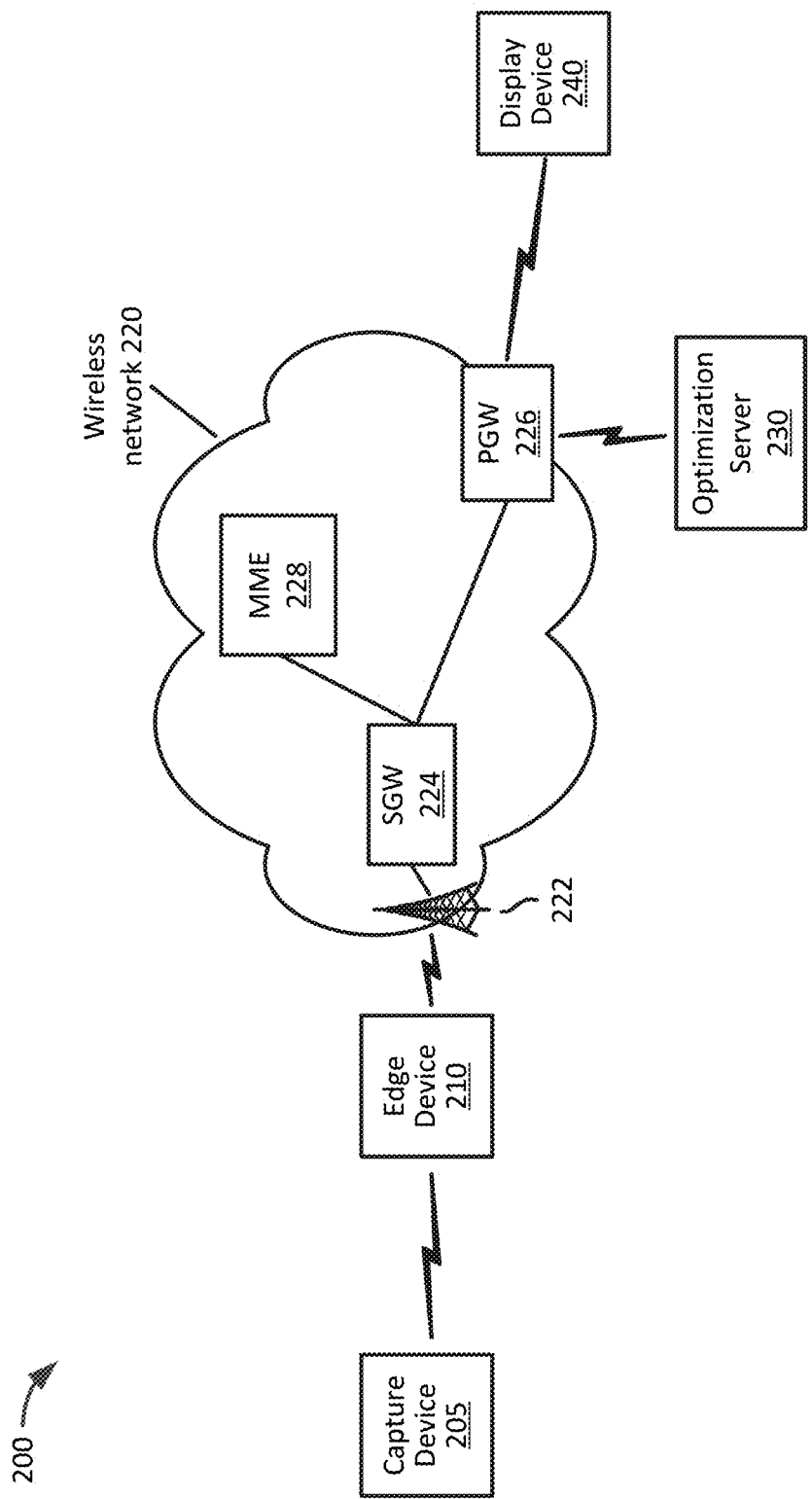
FIG. 2 is a diagram illustrating an example environment in which systems and/or methods described herein may be implemented.

FIG. 2 is a diagram illustrating an example environment 200 in which systems and/or methods described herein may be implemented. Environment 200 may include a capture device 205, an edge device 210, a wireless network 220, an optimization server 230, and a display device 240. Although a single capture device 205, edge device 210, optimization server 230, and display device 240 are illustrated in FIG. 2 for clarity, in practice, environment 200 may include any number of such devices. Wireless network 220 may be a cellular wireless network, such as a network based on the Third Generation Partnership Project (3GPP) standards, and may include a number of network elements that are used to provide wireless cellular network service to users. In the context of a Third Generation Partnership Project (3GPP) wireless network, endpoint devices that wirelessly connect to wireless network 220, may be referred to as User Equipment (UE) and may include capture device 205, as edge device 210, and/or display device 240.

Wireless network 220 may particularly include a RAN that implements a wireless (radio) interface with User Equipment (UE). For example, edge device 210 and display device 240 may be UEs that are capable of wirelessly communicating with wireless network 220. In some implementations, capture device 205 may also be a UE. In the context of the 3GPP network, the RAN may include base stations, some or all of which may take the form of enhanced Node Bs (eNBs) 222. In addition to the RAN, wireless network 220 may include a core portion, which, in the context of a 3GPP network, may be referred to as an Enhanced Packet Core (EPC). As illustrated, the EPC may include Serving Gateway (SGW) 224, PDN Gateway (PGW) 226, and Mobility Management Entity (MME) 228. The EPC may enable end devices to communicate with an external network, such as an Internet Protocol (IP) network (e.g., the Internet) that is connected through PGW 226.

Capture device 205 may include, for example, a camera or video capture device. Capture device 205 may include a wired or wireless interface to connect to external devices (e.g., to stream or upload video or images taken by capture device 205). For example, capture device 205 may connect to edge device 210 and upload video, taken by capture device 205, to edge device 210 (for further forwarding using wireless network 220). In some embodiments, capture device 205 may implement an interface that enables an external device to control the operation of capture device 205. For example, capture device 205 may implement an Application Programming Interface (API). Through the API, an external device may control when video or images are captured, image/video related parameters of the capture (e.g., resolution, focus, aperture, shutter speed, etc.), and/or coding related parameters. The coding related parameters may particularly include, for example, a particular bit rate to use to encode captured video, a particular codec to use for the encoding, particular image compression parameters to use, a particular frame rate, etc. As mentioned, in various implementations, capture device 205 may capture video, audio, or images (e.g., as a camera). For simplicity, in the description that follows, capture device 205 will be described as capturing video (e.g., a series of images that includes corresponding audio).

Edge device 210 may be a device that is used to connect capture device 205 to wireless network 220. For example, capture device 210 may be a "Wi-Fi hotspot" that includes a Wi-Fi interface (i.e., and IEEE 802.11 interface) and a cellular interface. In this implementation, capture device 210 may act as a Wi-Fi Access Point (AP) for nearby Wi-Fi devices and may provide general network connectivity via the cellular interface to wireless network 220. In some implementations, edge device 210 may additionally include video processing capabilities, such as the ability to transcode video streams. One implementation of edge device 210 will be described in more detail below with reference to FIG. 3.

In some implementations, edge device 210 may particularly be a device that is issued by the operator of wireless network 220 and is designed to provide network connectivity, via wireless network 220, to users. In this situation, because the operator of the wireless network 220 controls the manufacture/provisioning of edge device 210, it may be designed to work with the wireless network using the techniques described herein.

Optimization server 230 may include a computing and communication device that operates to control the operation of capture device 205, edge device 210, network devices associated with wireless network 220, and/or display device 240. Optimization server 230 may receive information relating to the operational state of wireless network 220, capabilities relating to capture device 205, edge device 210, and/or display device 240, and based on this information, optimize the communication of a video through wireless network 220. Optimization server 230 may be implemented as, for example, one or more geographically co-located or distributed server devices. In some implementations, optimization server 230 may be omitted and the operations described herein as being implemented by optimization server 230 may be performed by one or more of other devices shown in environment 200.

Display device 240 may include a UE that is to receive video recorded by capture device 205. Display device may receive the video images directly from capture device 205 (e.g., as a real-time stream) or from a content server that first stores the video recorded by capture device 205. Display device 240 may be, for example, a smart phone, a network connected television or other entertainment device, a wearable device, or another type of device that is capable of receiving and presenting content to a user.

The eNB 222, of wireless network 220, may include one or more network devices that receives, processes, and/or transmits traffic destined for and/or received from UEs (e.g., via an air interface). eNB 222 may be connected to a network device, such as site router, that functions as an intermediary for information communicated between eNB 220 and the EPC of wireless network 220. eNB 222 may provide the radio links for the wireless network. SGW 224 may aggregate traffic received from one or more eNBs 222 and may send the aggregated traffic to an external network or device via PGW 226. Additionally, SGW 224 may aggregate traffic received from one or more PGWs 226 and may send the aggregated traffic to one or more eNBs 222. SGW 224 may operate as an anchor for the user plane during inter-eNB handovers and as an anchor for mobility between different telecommunication networks. PGW 226 may include one or more network devices that may aggregate traffic received from one or more SGWs 224, and may send the aggregated traffic to an external network. PGW 226 may also, or alternatively, receive traffic from the external network and may send the traffic toward the UEs. MME 228 may include one or more computation and communication devices that act as a control node for eNB 222 and/or other devices that provide the air interface for the wireless telecommunications network. For example, MME 228 may perform operations to register the UEs with wireless network 220, to establish bearer channels (e.g., traffic flows) associated with a session with a UE, to hand off the UE to a different eNB, MME, or another network, and/or to perform other operations. MME 228 may additionally perform policing operations on traffic destined for and/or received from the UE, perform authentication, authorization, and/or accounting operations associated with the subscriber and/or a communication session with the UE.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc.

Alternatively, or additionally, one or more of the devices of environment 200 may perform one or more functions described as being performed by another one or more of the devices of environment 200. Additionally, the devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections may be shown between certain devices in FIG. 2, some of said devices may, in practice, communicate with each other via one or more additional devices and/or networks.

Figure 3:
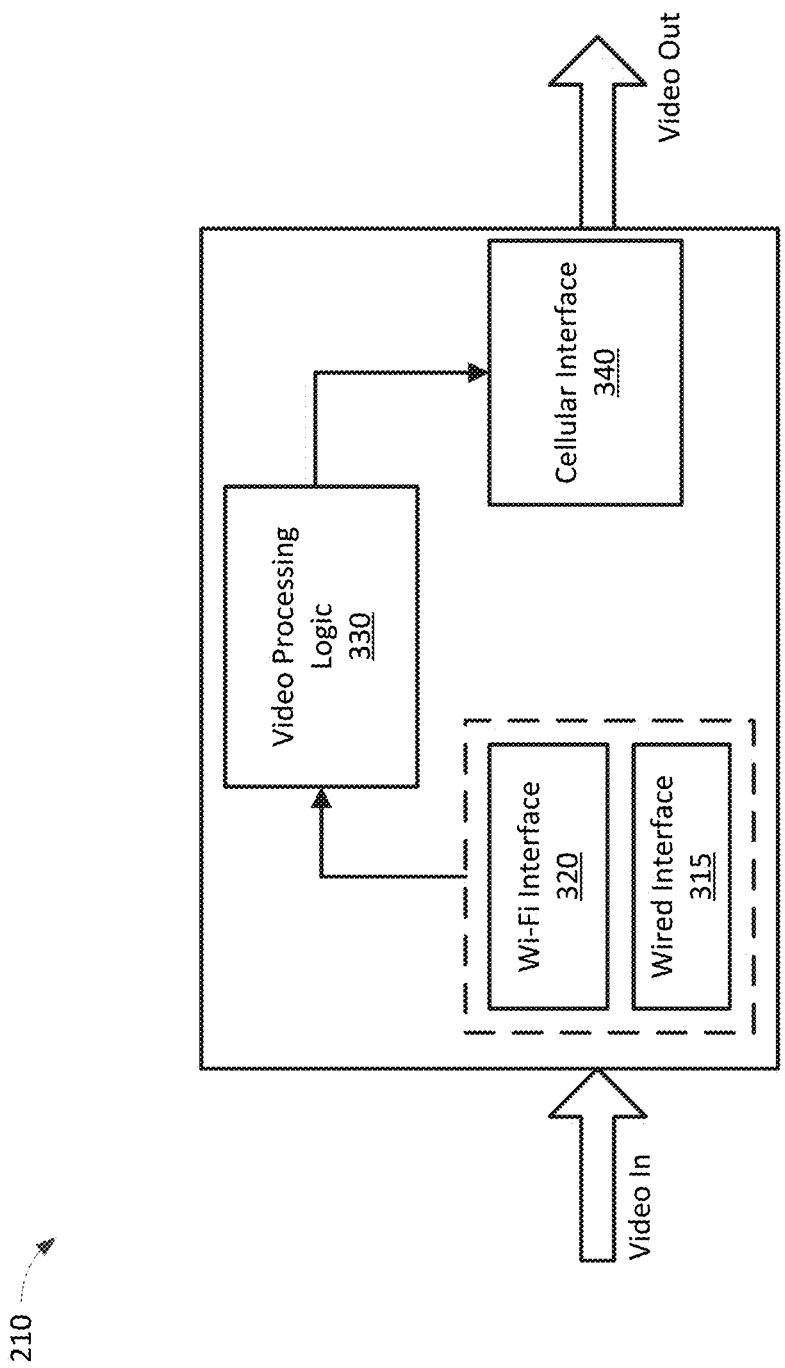
FIG. 3 is a diagram illustrating example functional components of an edge device.

FIG. 3 is a diagram illustrating example functional components of edge device 210. As shown, edge device 210 may include wired interface 315, Wi-Fi interface and 320, video processing logic 330, and cellular interface 340. Wired interface 315 may implement, for example, an ethernet interface, USB interface, or another type of interface in which capture device 205 may be directly plugged into edge device 210. Wi-Fi interface 320 may include logic to implement a Wi-Fi AP or a Wi-Fi direct node. In this manner, capture devices 205 (or other devices) may connect to edge device 210 using a short range wireless connection (e.g., Wi-Fi). In alternative implementations, the wireless connection may be implemented using other techniques, such as via Bluetooth. Cellular interface 340 may provide wireless network connection to a wireless network 220. For example, in one implementation, cellular interface 340 may provide a LTE connection.

In some implementations, it may be desirable to transcode video received from capture device 205. For example, capture device 205 may always transmit a high-resolution video stream to edge device 210. To avoid burdening wireless network 220, however, it may be desirable to reduce the bit rate of the video stream, increase the compression level of the video stream, transcode the video stream to a different codec, or perform other functions on the video stream. Video processing logic 330 may include video transcoding circuitry to perform the transcoding. As will be described in more detail below, the video processing logic 340 may be controlled based on instructions from devices in wireless network 220 and/or optimization server 230.

Figure 4:
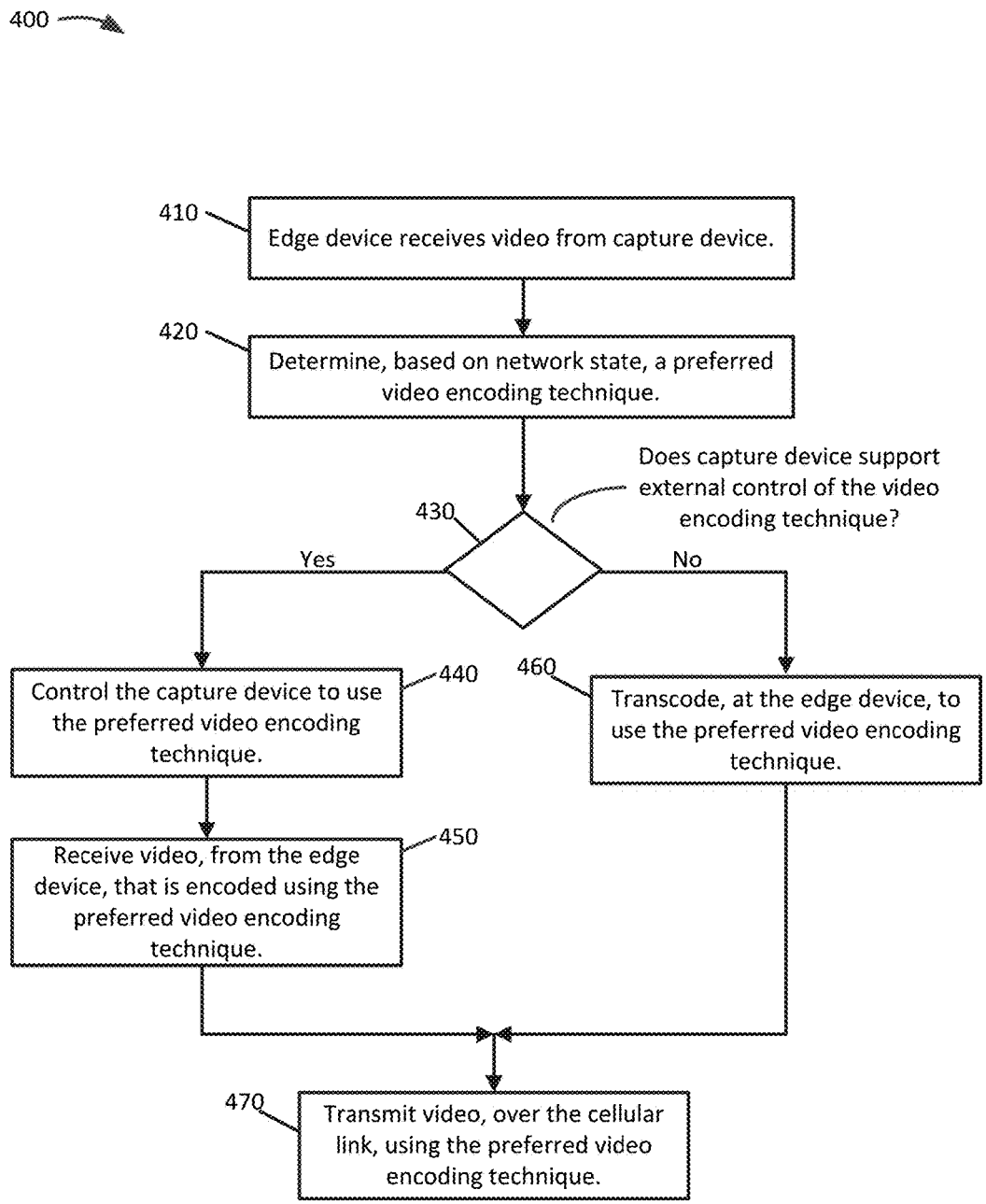
FIG. 4 is a flowchart illustrating an example process relating to optimization of a video stream before transmitting the stream over a wireless cellular link.

FIG. 4 is a flowchart illustrating an example process 400 relating to optimization of a video stream before transmitting the stream over a wireless cellular link (e.g., an LTE link). Process 400 and be performed by, for example, edge device 210.

Process 400 may include receiving captured video from the edge device (block 410). The video may be received, by edge device 210, using a local interface of edge device 210 (e.g., wired interface 315 or Wi-Fi interface 320).

Process 400 may further include determining, based on the network state (e.g., the state of wireless network 220), a preferred video encoding technique (block 420). The "preferred video encoding" technique may broadly refer to a combination of a particular bit rate to use, a particular codec to use, a particular frame rate to use, a particular resolution for the video, parameter values for the codec, etc. The preferred video encoding technique to use may be determined based on available resources of the wireless link of wireless network 220. Alternatively or additionally, the desired video quality at display device 240 may be used as a factor in determining the preferred video encoding technique.

In one particular implementation, edge device 210 may determine the preferred video encoding technique to use based on the current wireless link bandwidth, with eNB 222 (i.e., the link bandwidth or throughput of the air interface of wireless network 220), assigned to capture device 205. Alternatively or additionally, edge device 210 may receive an instruction from eNB 222 (or SGW 224, PGW 226, or MME 228) indicating a preferred video encoding technique to use. In still other potential implementations, edge device 210 may query optimization server 230 to determine the preferred video encoding technique to use. In this scenario, optimization server 230 may monitor the congestion state of wireless network 220 and choose and appropriate encoding technique to optimize the overall performance of wireless network 220.

In one implementation, the preferred encoding technique may additionally include a specific capture resolution that the cellular link can support. For example, as shown in Table I, below, a number of different video types, corresponding to a number of different resolution and frame rate combinations, as well as bit rate targets, may be defined. In one implementation, based on the bit rate that can be supported by the cellular link (e.g., as indicated based on the radio resources that are allocated to capture device 205 by eNB 222, and/or based on an indication provided in a message from the wireless network or optimization server 230) the preferred encoding technique may be defined as a particular video type and/or a particular resolution and framerate combination. For example, for a bit rate of 1500 kilo-bits-per-second (kbps), the video type 720p, which may correspond to a resolution of 1280×720 pixels, at 30 frames-per-second (fps), may be selected.

TABLE I

| Video Type | Resolution and Framerate | Target bit rate (kpbs) |
|---|---|---|
| 1080 p | 1920 × 1080@30 fps | 3000 |
| 720 p | 1280 × 720@30 fps | 1500 |
| 480 p | 854 × 480@30 fps | 500 |
| 360 p | 640 × 360@30 fps | 400 |

Process 400 may further include determining whether the capture device supports external control of the capture device to implement the preferred encoding technique (block 430). In some implementations, edge device 210 may store (or obtain from optimization server 230) a list of capture device identifiers (e.g., make and model type) that support external control of the capture device. The list may correspondingly include, for each capture device, instructions defining how the particular capture device can be controlled (e.g., particular API calls, etc.). When a particular capture device 205 is in the list, edge device 210 may thus determine that the capture device supports external control of the video encoding technique used by the capture device. In general, when dynamic control of encoding technique is supported by the capture device, it is desirable to control capture device 205 to perform the encoding rather than have the encoding done by edge device 210, as initially capturing and encoding a video stream pursuant to the desired encoding parameters tends to be more efficient than capturing a video streaming using a first set of encoding parameters and then later transcoding the video stream using a second set of encoding parameters. Additionally, by performing the encoding at video capture device 205 using the preferred encoding technique, the link budget between capture device 205 edge device 210 can be minimized if the data is already compressed to the desired level.

Process 400 may further include, when it is determined that the capture device supports external control of its video encoding technique, controlling the capture device to use the determined preferred video encoding technique (block 430—Yes, block 440). As previously mentioned, edge device 210 may control capture device 205 using an API supported by the capture device. Alternatively, in some possible implementations, the encoding technique that is to be used by capture device 205 may be customizable, but may only be customizable via a manual process performed by a user and not an automatic process that can be performed by edge device 210. In this situation, a user of capture device 205 may be notified, in some other manner, of the preferred encoding technique to use. For example, a message may be transmitted to a cellular phone of the user.

Process 400 may further include receiving video from the edge device that is encoded using the preferred video encoding technique (block 450). In this case, edge device 210 may primarily function to forward the encoded video to wireless network 220.

Process 400 may further include, when it is determined that the capture device does not support external control of the video encoding technique, transcoding the video, received from the capture device, at edge device 210 (block 430—No, block 460). The transcoded video may thus be in a format that can be optimally supported by wireless network 220.

The video stream, which may either have been transcoded by edge device 210 or encoded by capture device 205, may forward over the cellular link (block 470). In some implementations, the video stream may be a real-time device-to-device stream, such as one provided to display device 240. Alternatively, in other implementations, the video stream may be stored by an external content server and may later be delivered to one or more display devices 240.

In some implementations, in addition to or in the alternative to adjusting the preferred video encoding technique, edge device 210 may request (e.g., from eNB 222) that the Quality of Service (QoS) of the cellular link be increased. For example, it may be desirable that the video quality be kept above a certain minimal threshold level. Before adjusting the encoding technique to reduce the video quality below the minimum threshold level, edge device 210 may request additional radio resources from wireless network 220.

Adjustment of the encoding technique, as described above, may include modifying a number of possible encoding-related parameters. For example, by changing the quantization levels or changing the macro block size used by the encoding technique, the video resolution may be optimized for display device 240.

In some implementations, edge device 210 or optimization server 230 may dynamically adjust the video encoding technique to, based on the situation, either conserve power or increase performance. For example, in situations in which power should be conserved, such as when capture device 205 or display device 240 is a battery powered device with a low battery level, the video encoding technique used by capture device 205 or edge device 210 may be adjusted to require less computation and thus use less power. Alternatively, in situations in which battery life is not an issue, the video encoding technique may be adjusted to provide the maximum performance possible for a given bit rate.

In some implementations, the encoding technique to use may be optimized for the display device. This technique may be particularly useful when the video streaming is real-time and point-to-point. As an example, if the video source is of a higher resolution than can be usefully displayed by display device 240, the resolution of the video stream may be lowered to a level that is appropriate for the display device. When the video stream is to be broadcast to multiple display devices, the resolution of the video stream may be adjusted to a level that is appropriate for the display device with a larger screen.

In some implementations, the preferred encoding technique may include the application of a pre-filter, either by capture device 205 or by edge device 210, to emphasize important areas of the video and de-emphasize less critical areas. For example, for a video conference, facial areas may be emphasized or preserved while background areas of the video may be smoothed out to thus reduce the overall bandwidth of the video stream while still retaining important visual areas of the video.

Figure 5:
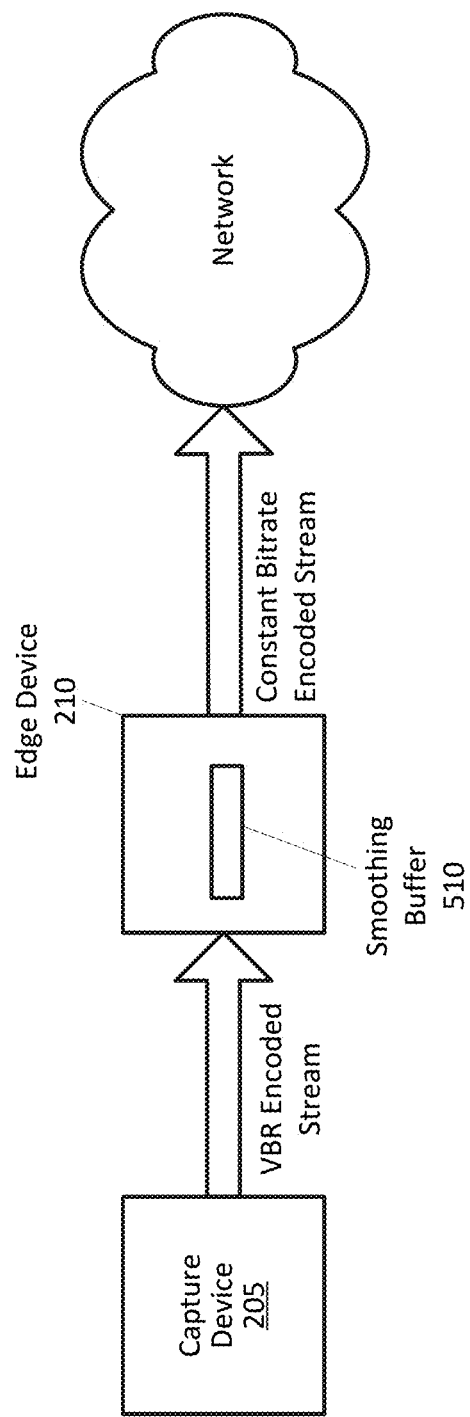
FIG. 5 is a diagram illustrating an example of complementary video processing performed by a capture device and an edge device.

In some implementations, capture device 205 and edge device 210 may work together to process the video stream in a complementary manner. FIG. 5 is a diagram illustrating an example of complementary video processing performed by capture device 205 and edge device 210. In this example, edge device 210 and/or optimization server 230 may coordinate the various processing functions performed by capture device 205 and edge device 210.

As one example of complementary processing, capture device 205 may perform variable bit rate (VBR) encoding of the video stream. A variable bit rate stream may not be optimal for transferring data over the cellular link as the low bit rate portions of the variable bit rate stream may result in wasted spectrum resources. Accordingly, edge device 210 may implement a jitter smoothing buffer 510 that operates to smooth out the variable bit rate stream to a more constant bit rate (or nearly constant bit rate) stream. The smoothing may be useful to optimize operation of a network scheduler. The network scheduler (e.g., as implemented in eNB 222) may have a statistical "preference" for constant bit rate traffic. However, for performance and efficiency, some video streams may be generated as a variable bit rate stream. Efficiency of the network scheduler may suffer as the network scheduler tries to respond to the peaks and valleys of the variable bit rate data stream.

Figure 6:
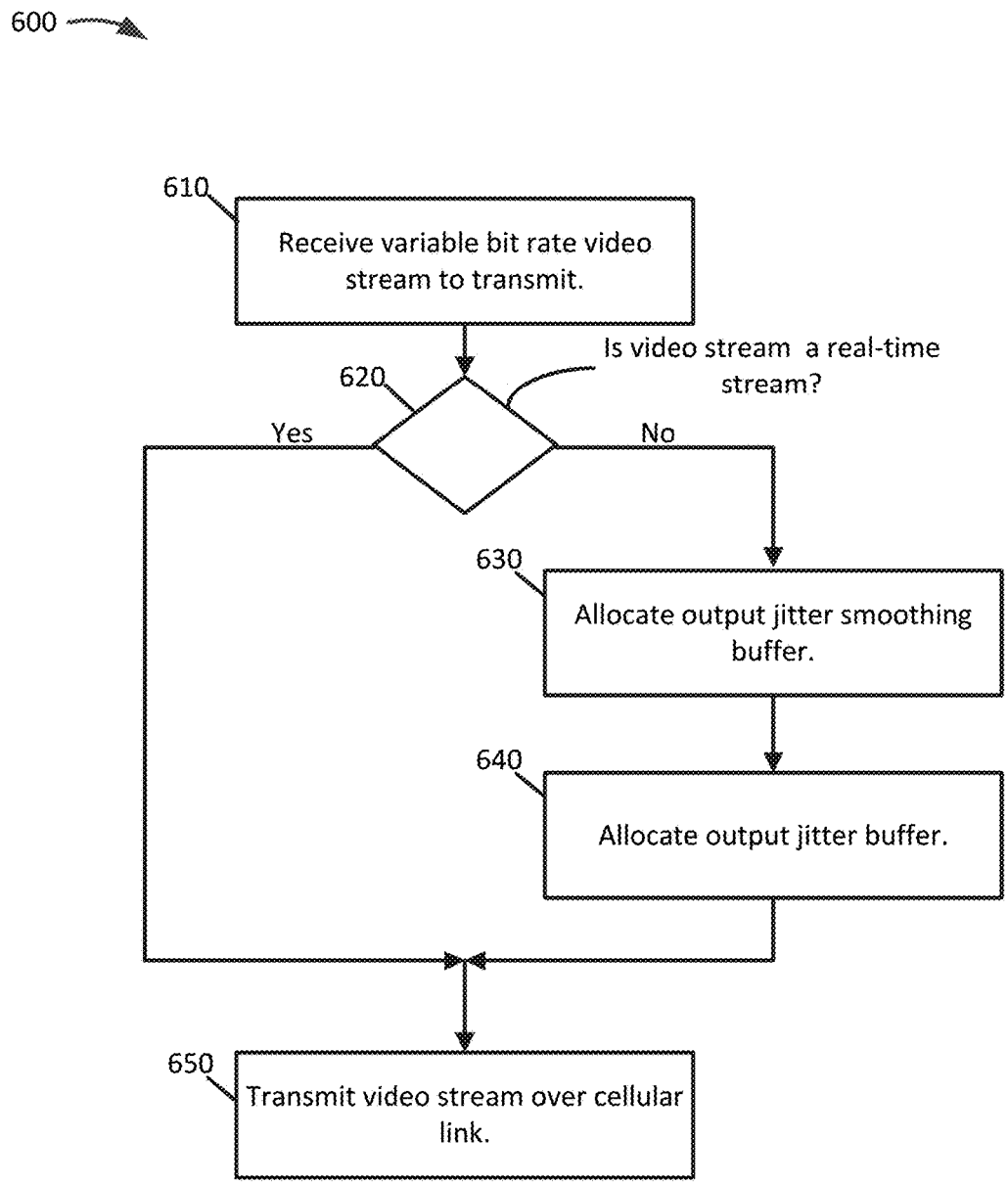
FIG. 6 is a flowchart illustrating an example process relating to smoothing of a variable bit rate stream to obtain a constant or near constant bit rate stream.

FIG. 6 is a flowchart illustrating an example process 600 relating to smoothing of a variable bit rate stream to obtain a constant or near constant bit rate stream. Process 600 may be performed by, for example, capture device 205 or edge device 210.

Process 600 may include receiving a variable bit rate video stream to transmit (block 610). For example, when process 600 is being performed by edge device 210, the variable bit rate stream may be received from capture device 205.

Process 600 may further include determining whether the video stream is a real-time stream (block 620). In one implementation, an indication of whether a video stream is a real-time stream may be provided by optimization server 230 to edge device 210. Alternatively, messages may be exchanged with display devices 240 to determine whether a video stream is to be a real-time stream. In general, real-time video streams, such as a stream used for video calling or video conferencing, are not appropriate for variable bit rate smoothing, as the delay introduced, due to the buffering, may not make for a good user experience.

Process 600 may further include, when the video stream is not a real-time stream (block 620—No), allocating a smoothing buffer for the video stream (block 630). The buffer may be allocated to support the maximum peak bit rate. The input variable bit rate stream may be stored in the smoothing buffer and converted to a more constant bit rate stream (block 640). For example, the buffer may be read out a constant rate that is set to an average bit rate of the input stream.

The constant bit rate stream may be transmitted over the radio link of the cellular wireless network (block 650). At the receiving device, a second buffer may similarly be used to convert the constant input bit rate stream back to the originally encoded variable bit rate stream.

As previously mentioned, in situations in which a device, such as capture device 205 or edge device 210 is powered from a battery, it may be desirable to use the current battery level of the device as a factor in determining the encoding technique to use.

Figure 7:
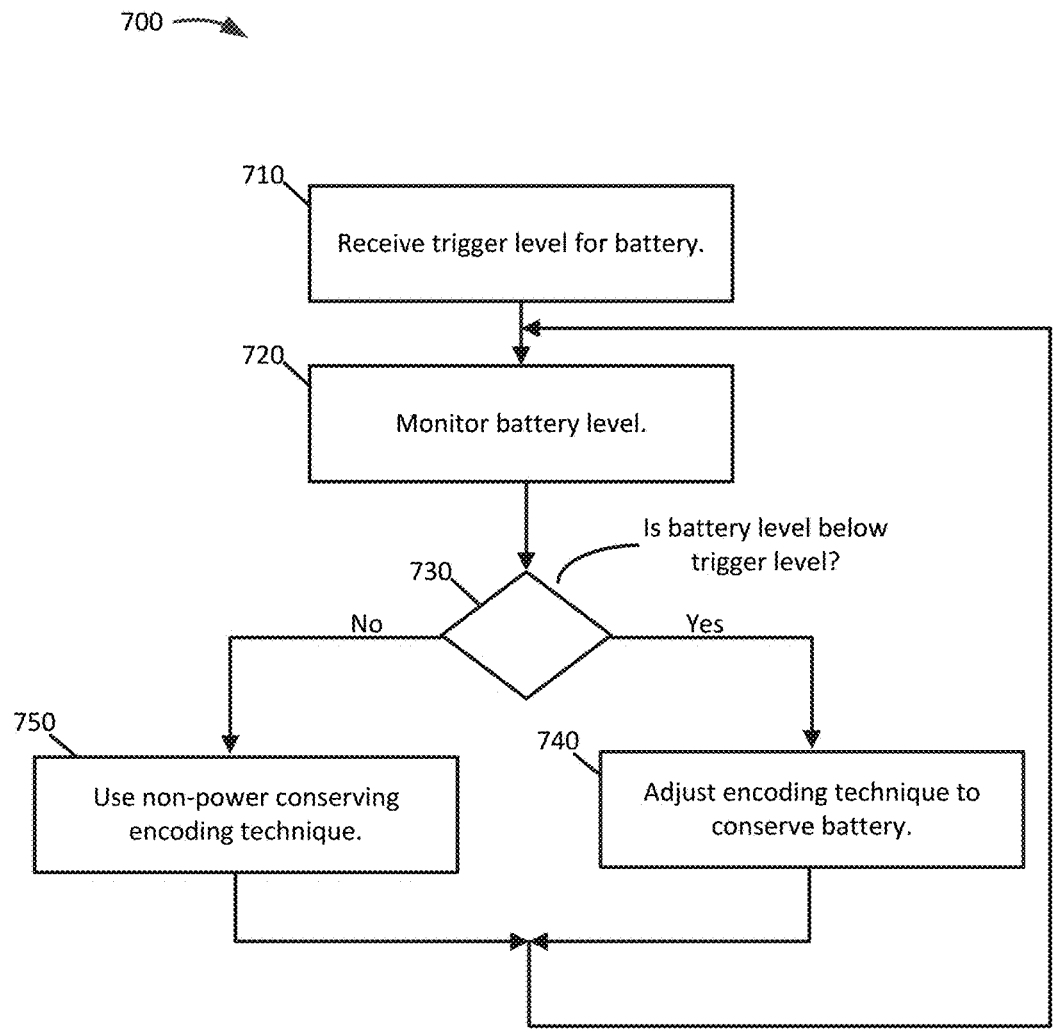
FIG. 7 is a flowchart illustrating an example process relating to using the battery level as a factor in determining the encoding technique to use.

FIG. 7 is a flowchart illustrating an example process 700 relating to using the battery level as a factor in determining the encoding technique to use. Process 700 may be implemented by, for example, capture device 205 or edge device 210.

Process 700 may include receiving a trigger level for the battery of the device (e.g., of edge device 210) (block 710). The trigger level may be, for example, a level input by a user of the device, either directly into the device or through another service (e.g., a web portal provided by optimization server 230). The trigger level may be a battery percentage level or some other value relating to battery capacity. In some implementations, the trigger level does not need to be explicitly set by the user, but may be specified as a factory configured value.

Process 700 may further include monitoring the batter level of the device (block 720) and when the battery level falls below the trigger level (block 730—Yes), adjusting the encoding technique to conserve battery (block 740). For example, the compression level, bit rate, or other parameter or set of parameters may be adjusted to values to minimize power usage. In implementations in which edge device 210 is the battery powered device, edge device may control capture device 205 to provide a video stream that requires less power to transcode (e.g., by lowering the resolution of the video stream).

When the battery level is not below the trigger level (block 730—No), process 700 may include using the "normal" (non-power conserving) encoding technique (block 750).

Figure 8:
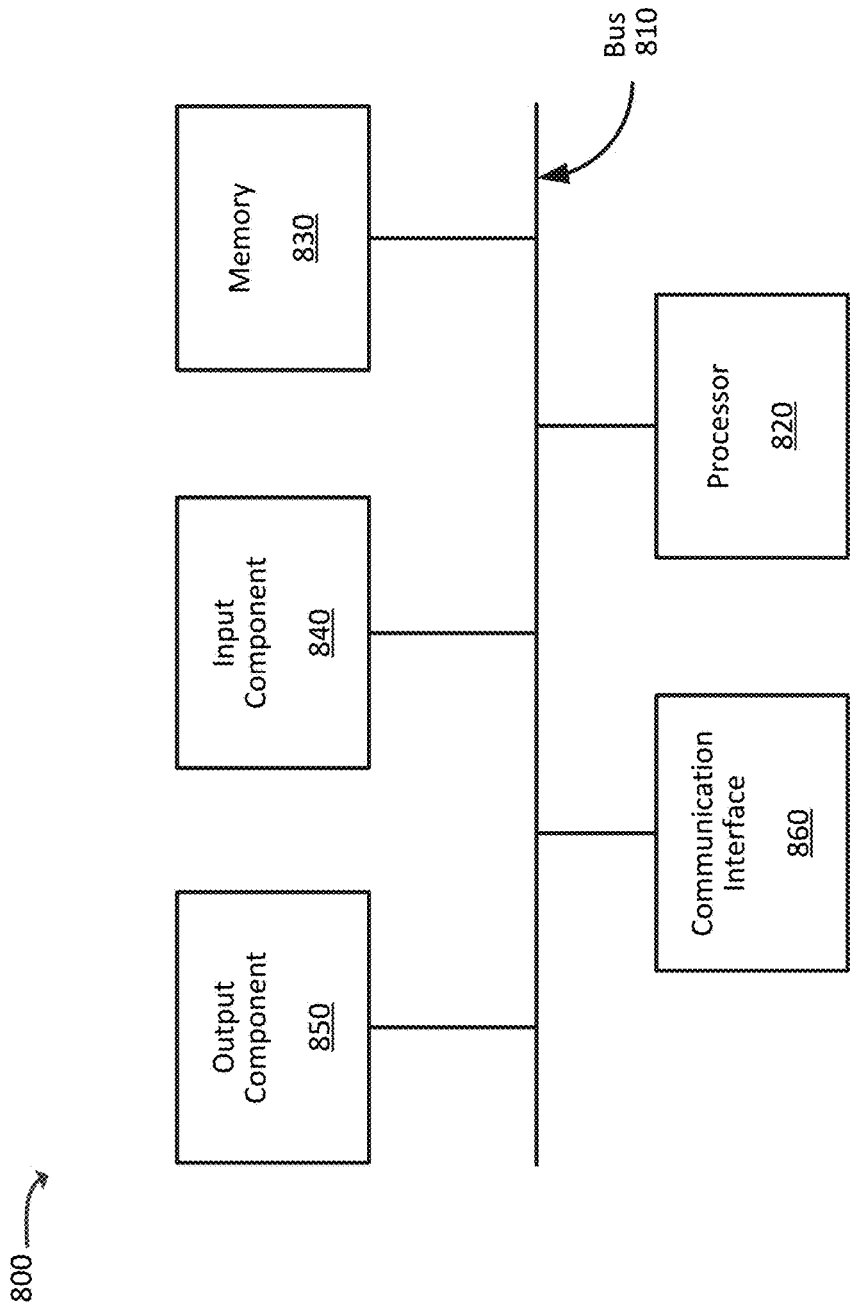
FIG. 8 is a diagram of example components of a device.

FIG. 8 is a diagram of example components of a device 800. Device 800 may represent capture device 205, edge device 210, optimization server 230, a device associated with wireless network 220, display device 240, or another device. Device 800 may include bus 810, processor 820, memory 830, input component 840, output component 850, and communication interface 860. In another implementation, device 800 may include additional, fewer, different, or differently arranged components. As described herein, a component may be implemented by hardware circuitry, software logic, and/or some combination thereof.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 1320 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 4, 6, and 7, the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. An edge device comprising:
   a local interface;
   a radio frequency (RF) interface to connect to a cellular wireless network;
   a non-transitory computer-readable medium storing a set of processor-executable instructions; and
   one or more processors configured to execute the set of processor-executable instructions, wherein executing the set of processor-executable instructions causes the one or more processors to:
      receive, via the RF interface, information relating to a network state of the cellular wireless network;
      receive a video stream, from a capture device, via the local interface;
      select, based on the information relating to the network state, a particular codec to apply to the video stream;
      select, based on the information relating to the network state, additional parameters to apply to the video stream, the additional parameters including at least one of:
         a video capture resolution,
         a bit rate of the video stream, or
         one or more parameters relating to the particular codec;
      determine whether encoding parameters of the capture device are controllable by the edge device;
      control, when it is determined that the encoding parameters of the capture device are controllable by the edge device, the capture device to implement the particular codec for the video stream and to apply the additional parameters;
      transcode, when it is determined that the encoding parameters of the capture device are not controllable by the edge device, the received video stream from a codec associated with the received video stream to the selected particular codec;
      apply, when it is determined that the encoding parameters of the capture device are not controllable by the edge device, the additional parameters to the received video stream; and
      transmit, via the RF interface, the video stream, with the selected particular codec and the additional parameters applied, to the cellular wireless network.

2. The edge device of claim 1, wherein the device is a mobile Wi-Fi hotspot device and the local interface includes a Wi-Fi interface.

3. The edge device of claim 1, wherein the information relating to the network state is obtained, by the edge device, by measuring a quality of a wireless link that is assigned to the capture device for communicating with the cellular wireless network.

4. The edge device of claim 1, wherein the information relating to the network state is obtained, by the edge device, as a message received from network elements of the cellular wireless network.

5. The edge device of claim 1, wherein the video stream received from the capture device is a variable bit rate stream, and wherein executing the set of processor-executable instructions further causes the one or more processors to:
   implement a smoothing buffer to buffer the variable bit rate stream; and
   read from the smoothing buffer at a constant rate to cause a constant rate stream to be transmitted via the RF interface with the cellular wireless network.

6. The edge device of claim 1, wherein executing the set of processor-executable instructions further causes the one or more processors to:
   filter the video stream, received from the capture device, to emphasize certain areas of the video and de-emphasize other areas of the video.

7. The edge device of claim 1, wherein the information relating to the network state of the cellular wireless network describes a congestion state of a Radio Access Network (RAN) of the cellular wireless network.

8. A method, performed by an edge device of a cellular wireless network, the method comprising:
   receiving information relating to a network state of the cellular wireless network;
   receiving a video stream, from a capture device that is connected to the edge device via a local interface;
   selecting, based on the information relating to the network state, a particular codec to apply to the video stream;
   selecting, based on the information relating to the network state, additional parameters to apply to the video stream, the additional parameters including at least one of:
      a video capture resolution,
      a bit rate of the video stream, or
      one or more parameters relating to the particular codec;

determining whether encoding parameters of the capture device are controllable by the edge device;

controlling, when it is determined that the encoding parameters of the capture device are controllable by the edge device, the capture device to implement the particular codec to apply to the video stream and to apply the additional parameters;

transcoding, when it is determined that the encoding parameters of the capture device are not controllable by the edge device, the received video stream from a codec associated with the received video stream to the selected particular codec;

applying, when it is determined that the encoding parameters of the capture device are not controllable by the edge device, the additional parameters to the received video stream; and transmitting the video stream, with the selected particular codec and the additional parameters applied, to the cellular wireless network.

9. The method of claim 8, wherein the device is a mobile Wi-Fi hotspot device and the local interface includes a Wi-Fi interface.

10. The method of claim 8, wherein the information relating to the network state is obtained, by the edge device, by measuring a quality of a wireless link that is assigned to the capture device for communicating with the cellular wireless network.

11. The method of claim 8, wherein the information relating to the network state is obtained, by the edge device, as a message received from network elements of the cellular wireless network.

12. The method of claim 8, wherein the video stream received from the capture device is a variable bit rate stream, and wherein the method further includes:

implementing a smoothing buffer to buffer the variable bit rate stream; and reading from the smoothing buffer at a constant rate to cause a constant rate stream to be transmitted via the RF interface with the cellular wireless network.

13. The method of claim 8, further comprising:

filtering the video stream, received from the capture device, to emphasize certain areas of the video and de-emphasize other areas of the video.

14. The method of claim 8, wherein the information relating to the network state of the cellular wireless network describes a congestion state of a Radio Access Network (RAN) of the cellular wireless network.

15. A non-transitory, computer-readable medium storing a plurality of processor-executable instructions, wherein executing the processor-executable instructions causes one or more processors, associated with an edge device of a cellular wireless network, to:

receive information relating to a network state of the cellular wireless network;

receive a video stream, from a capture device that is connected to the edge device via a local interface;

select, based on the information relating to the network state, a particular codec to apply to the video stream;

select, based on the information relating to the network state, additional parameters to apply to the video stream, the additional parameters including at least one of:

a video capture resolution, a bit rate of the video stream, or one or more parameters relating to the particular codec;

determine whether encoding parameters of the capture device are controllable by the edge device;

control, when it is determined that the encoding parameters of the capture device are controllable by the edge device, the capture device to implement the particular codec for the video stream;

transcode, when it is determined that the encoding parameters of the capture device are not controllable by the edge device, the received video stream from a codec associated with the received video stream to the selected codec;

apply, when it is determined that the encoding parameters of the capture device are not controllable by the edge device, the additional parameters to the received video stream; and transmit the video stream, with the particular codec applied, to the cellular wireless network.

16. The computer-readable medium of claim 15, wherein the device is a mobile Wi-Fi hotspot device and the local interface includes a Wi-Fi interface.

17. The computer-readable medium of claim 15, wherein the information relating to the network state is obtained, by the edge device, by measuring a quality of a wireless link that is assigned to the capture device for communicating with the cellular wireless network.

18. The computer-readable medium of claim 15, wherein the information relating to the network state is obtained, by the edge device, as a message received from network elements of the cellular wireless network.

19. The non-transitory computer-readable medium of claim 15, wherein the video stream received from the capture device is a variable bit rate stream, and wherein executing the set of processor-executable instructions further causes the one or more processors to:

implement a smoothing buffer to buffer the variable bit rate stream; and read from the smoothing buffer at a constant rate to cause a constant rate stream to be transmitted via the RF interface with the cellular wireless network.

20. The non-transitory computer-readable medium of claim 15, wherein executing the set of processor-executable instructions further causes the one or more processors to:

filter the video stream, received from the capture device, to emphasize certain areas of the video and de-emphasize other areas of the video.

* * * * *